United States Patent [19]

Oetiker

[11] Patent Number: 4,811,581

[45] Date of Patent: Mar. 14, 1989

[54] APPARATUS FOR PREFORMING A SUBSTANTIALLY FLAT BLANK OF AN OPEN CLAMP

[76] Inventor: Hans Oetiker, Oberdorfstrasse 21, CH-8810 Horgen 2, Switzerland

[21] Appl. No.: 926,907

[22] Filed: Nov. 4, 1986

Related U.S. Application Data

[62] Division of Ser. No. 563,823, Dec. 21, 1983, Pat. No. 4,633,698.

[51] Int. Cl.$^4$ .......................... B21D 5/14; B21D 53/36; B21C 51/00
[52] U.S. Cl. ............................................ 72/14; 72/27; 72/30; 72/168; 72/171
[58] Field of Search .......... 72/168, 166, 169, 170–174, 72/167, 14, 15, 27, 214, 215, 452, 30; 29/150

[56] References Cited

U.S. PATENT DOCUMENTS

| | | | |
|---|---|---|---|
| 449,624 | 3/1891 | Kurtz | 72/168 |
| 1,303,849 | 5/1919 | Bryant | 72/171 |
| 1,762,556 | 6/1930 | Marshall | 72/166 |
| 1,771,955 | 7/1930 | Fork et al. | 72/168 |
| 3,676,910 | 7/1972 | Gross | 72/170 |
| 3,746,238 | 7/1973 | Sprague | 72/168 |
| 4,365,492 | 12/1982 | Kortan et al. | 72/14 |
| 4,425,781 | 1/1984 | Oetiker | 72/384 |

Primary Examiner—Daniel C. Crane
Attorney, Agent, or Firm—Paul M. Craig, Jr.

[57] ABSTRACT

A method and apparatus for preforming a substantially flat blank of an open clamp adapted to be mechanically interconnected near the free ends thereof into a circular clamp having a configuration at least approximately the configuration of the clamp when installed about an object to be fastened onto a relatively fixed, generally circular part; as the flat blank is being fed through the machine, it is performed into a generally circular shape with the free ends thereof axially spaced from one another; the pair of rollers feeding the blank may also be so shaped in their external contours that the lateral edges of the blank are bent out in the generally radial direction; additionally the blank is automatically stopped after an initial short feed through the machine to permit stamping of a predetermined part of the flat blank; the entire operation which is preferably pneumatically controlled is thereby automatically cyclically operated as soon as a flat blank is inserted into the machine a predetermined distance.

24 Claims, 4 Drawing Sheets

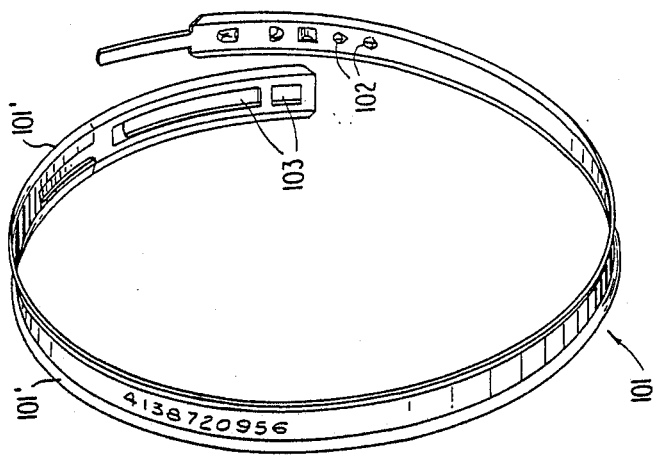
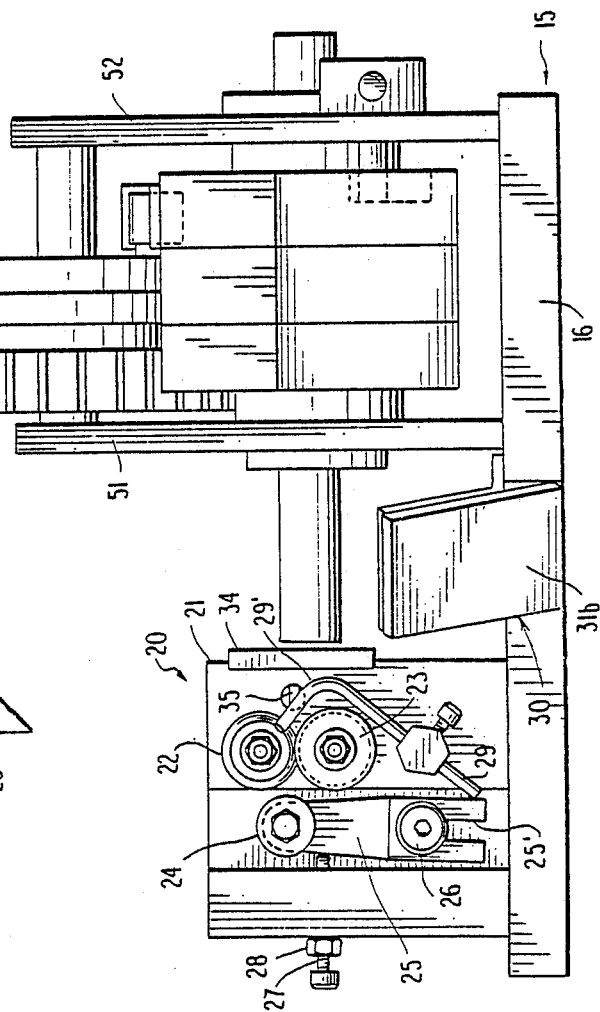
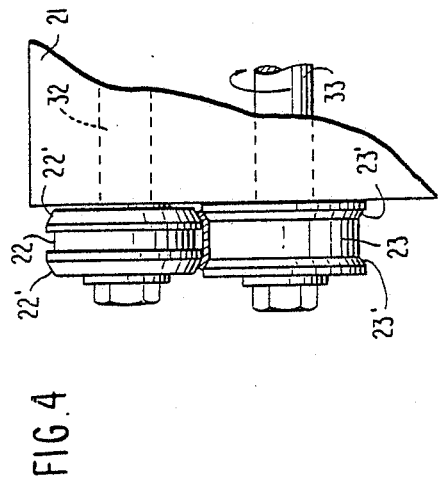

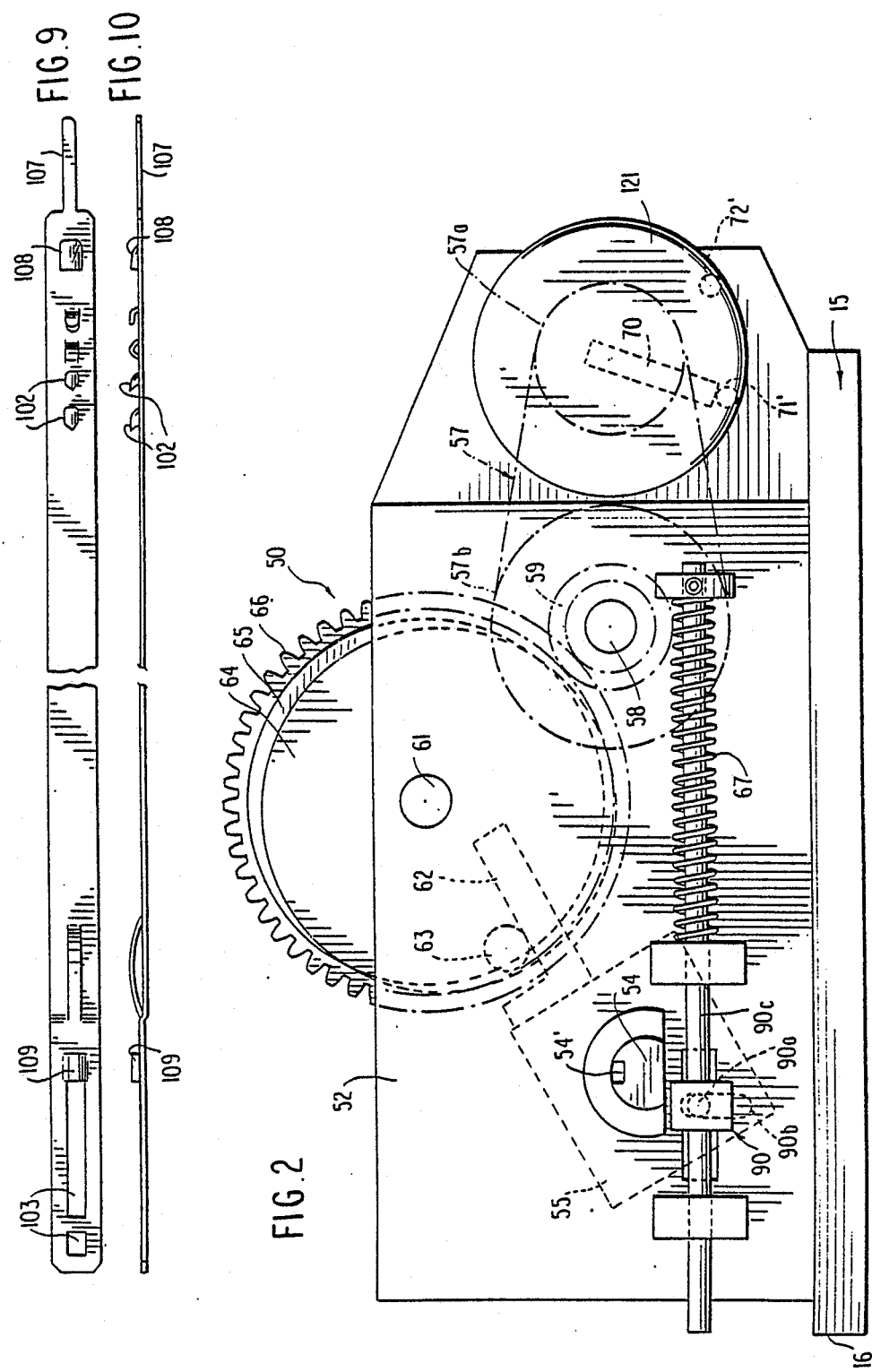

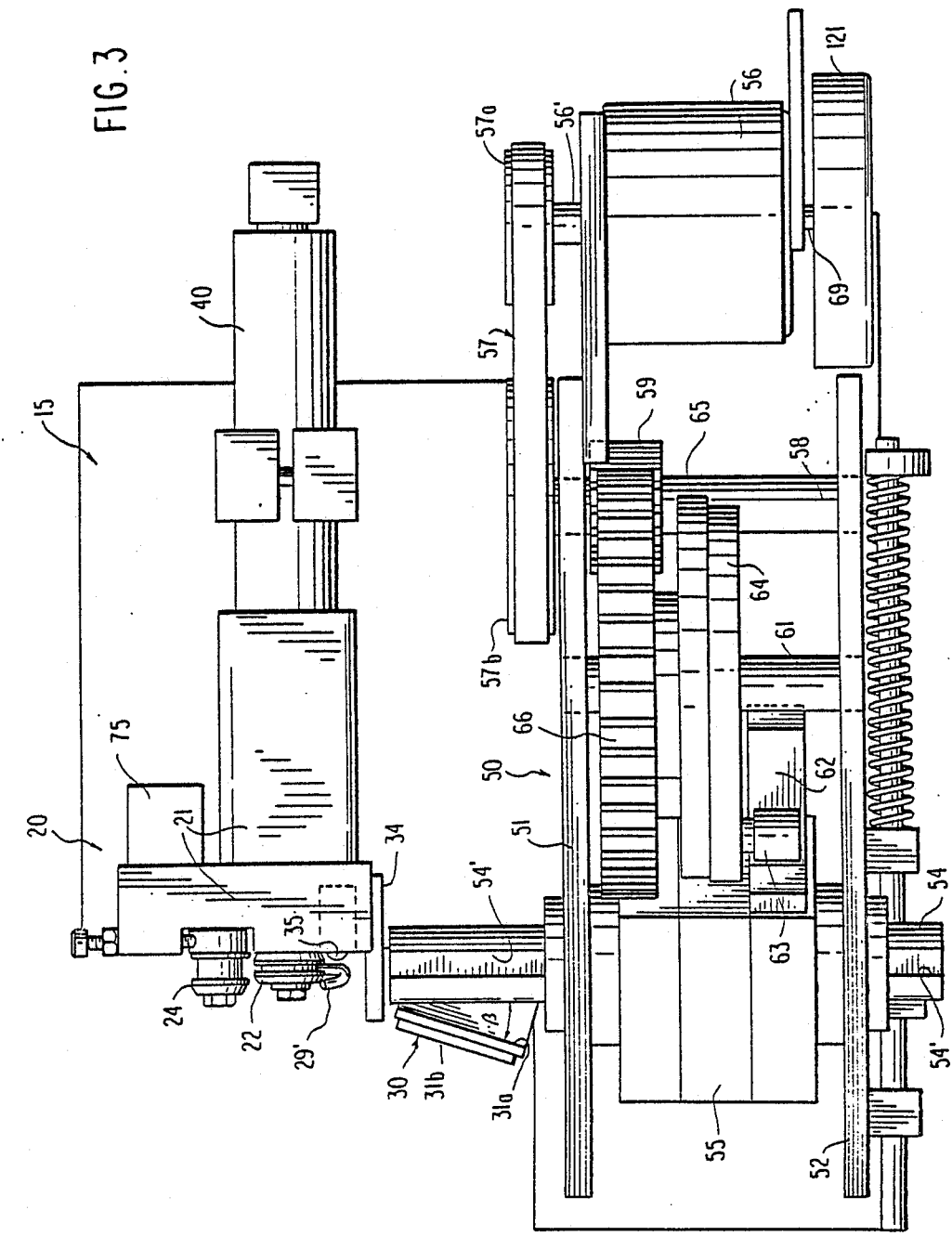

APPARATUS FOR PREFORMING A SUBSTANTIALLY FLAT BLANK OF AN OPEN CLAMP

This application is a divisional application of my copending application Ser. No. 563,823 filed on Dec. 21, 1983, and entitled "Method and Apparatus for Preforming a Substantially Flat Blank of an Open Clamp".

The present invention relates to a method and apparatus for preforming a substantially flat blank of an open clamp adapted to be mechanically interconnected near the free ends thereof into a circular clamp having a configuration at least approximately the configuration of the clamp when installed, as well as to the preformed open clamp obtained by the use of the method and apparatus of the present invention.

Basically, two types of clamps are commercially available; namely, so-called endless or permanently closed types of clamps and so-called open types of clamps adapted to be mechanically interconnected near the free ends thereof. My prior U.S. Pat. Nos. 2,614,304 and 3,082,498 (FIGS. 1 and 2) disclose clamps of the endless type which are made from tubular material. In the alternative, endless or closed-type clamps are known which have their ends permanently connected, for example, by spot-welding or in a rivet-like manner (U.S. Pat. No. 3,286,314). U.S. Pat. Nos. 3,475,793; 3,321,811; 4,222,155 and 3,082,498 (FIGS. 3 and 4) disclose various types of open clamp structures to be mechanically interconnected near their free ends by engagement of hooks into apertures. Other types of open clamps are so-called screw-type clamps whose ends are drawn together by a screw or bolt. Still other open-type clamp structures utilize a toggle mechanism to draw together the free band ends. Both types of clamp structures are frequently made from band material, normally stored in the form of a coil. One method for making a permanently closed clamp is disclosed in the U.S. Pat. No. 3,021,631 to Kennedy, according to which the band is fed to forming dies where it is punched out in such a shape as to permit permanent locking of the band in the subsequent steps. More particularly, in this patent, after the punching operation, the band is brought into engagement with a mandrel of predetermined shape, is pressed into the final shape by coacting die members which cause a tongue portion of the punched-out band to pass through an opening, whereupon the tongue portion is bent back upon itself and is thereafter tightly crimped or pressed into the locking position forming the closed or endless clamp structure. The clamps, whether in the permanently locked condition or with their ends open, were normally preformed into circular shape in the course of their manufacture and were shipped to the customer in this circular shape. Though bending of the band material by hand had been suggested previously in my prior U.S. Pat. No. 2,847,742, it was an accepted, generally unquestioned practice to manufacture the various types of open clamp structures with generally circular configuration to assure proper installation thereof by the user, for example, on the assembly line, particularly as difficulties are likely to be encountered in the installation of open clamps, whether of completely flat configuration or of flat configuration over only a major part of the clamp band as disclosed in U.S. Pat. No. 3,235,925 to Gerhardt et al. Hence, these types of open clamp structures were normally manufactured and shipped to the customer in preformed condition, frequently in quasi-endless condition, i.e., with the hooks of the circular band already engaged in apertures. If these types of clamps were to be installed axially, the operator merely slipped these quasi-endless clamps over the object to be fastened and then proceeded to tighten the clamp, for example, by the closing of a so-called "Oetiker" ear. On the other hand, if these quasi-endless types of clamps were to be installed radially, the clamps had to be reopened, placed about the object to be fastened and reconnected at the free ends, whereupon the clamp was tightened, for example, again by contracting a so-called "Oetiker" ear.

With large-quantity use of these types of open clamps in mass production applications, such as on the assembly line of the automotive industry, a reduction of the overall costs in the use of these clamps whose raw material costs were fixed, could be achieved only by a reduction in the cost of manufacture, handling and use thereof. Apart from the fact that the prior art types of open clamp having a generally circular configuration required a different machine for each clamp size, the maximum rate of production thereof was limited by the operating step requiring the greatest amount of time, which turned out to be the bending of the clamps into the more or less circular shape.

Recognizing tee shortcomings and drawbacks of the prior art, I proposed the use of a preforming machine to permit manufacture and shipment of the punched-out clamps in flat blank condition in my prior application Ser. No. 231,275, filed Feb. 4, 1981, now U.S. Pat. No. 4,435,781. According to this prior application, the two ends were each deformed into predetermined configuration so as to facilitate assembly of the clamp over the object to be fastened by the preformed shape of the clamp resulting from deformation and spring-back action of the resilient band material. The present invention represents a further improvement over the apparatus and method disclosed in my copending application in that the clamp is preformed from its flat blank condition into circular configuration having predetermined diametric dimensions substantially corresponding to the desired diametric dimension of the clamp when installed over the object to be fastened but prior to tightening thereof.

Accordingly, the principal object of the present invention is to overcome the aforementioned shortcomings and drawbacks encountered in the prior art and to provide a method and apparatus by means of which significant savings can be attained in the use of open clamps without jeopardizing their proper installation and their holding ability.

The underlying problems are solved according to the present invention in that the clamps are punched-out as flat blanks, are shipped in such flat condition to the customer, who, by the use of the method and apparatus in accordance with the present invention, thereupon preforms the flat blanks into predetermined shape before the clamp is installed about the object to be fastened, for example, about an axle boot on the assembly line in the automobile industry. According to the method and apparatus of the present invention, the punched-out flat blank is fed through the machine that includes a pair of feed rollers which are spaced from one another a distance essentially corresponding to the thickness of the blank so as to feed the blank through the machine, and the thus-fed blanks are then deformed into generally circular shape of predetermined diameter with the free ends thereof axially spaced from one another by a relatively small distance as a result of engagement with a deforming member, preferably in the form of a freely rotating roller. The pair of feed rollers are thereby positively driven according to a predetermined control cycle.

According to another feature of the present invention, the flat blank of the clamp can also be provided with any desired indicia or markings, such as date of installation, trademark of user of the clamp and the like, by the use of a stamping mechanism which is located ahead of the deforming mechanism and in which the flat blank is stamped or embossed. According to the present invention, the stamping and deforming mechanisms are controlled by an automatic control system which causes the feed rollers to be actuated for a short period of time when the leading end of the blank encounters a sensor so as to position the blank correctly for the stamping operation in a predetermined part of the blank while the drive of the feed rollers is interrupted, and resuming the operation of the feed rollers upon completion of the stamping operation to thereafter complete the preforming operation of the clamp into generally circular configuration. Since the diameter of the preformed clamp must be so chosen that its ends overlap, the preforming operation also deforms the clamp so that the free ends thereof in the completely preformed, generally circular configuration are spaced a small axial distance from one another in order to avoid interference in the preforming operation by the leading end which would otherwise seek to re-enter the feeding roller pair.

According to still a further feature of the present invention, the feed rollers may be so shaped that the lateral edges of the blank are bent outwardly as viewed in the radial direction of the preformed clamp so as to lessen the likelihood of damage of the hose material when the clamp is installed.

These and other objects, features and advantages of the present invention will become more apparent from the following description when taken in connection with the accompanying drawing which shows, for purposes of illustration only, one embodiment in accordance with the present invention, and wherein:

FIG. 1 is a front elevational view of a preforming machine in accordance with the present invention;

FIG. 2 is a right side elevational view of the preforming machine of FIG. 1;

FIG. 3 is a top plan view of the preforming machine of FIGS. 1 and 2;

FIG. 4 is a partial side elevational view, on an enlarged scale, of the feed rollers in a preferred embodiment of the machine in accordance with the present invention;

FIGS. 9 and 10 are, respectively, plan and side elevational views of a clamp with which the machine of the present invention can be used; and FIG. 11 is a perspective view of a preformed clamp in accordance with the present invention.

Figure 6:
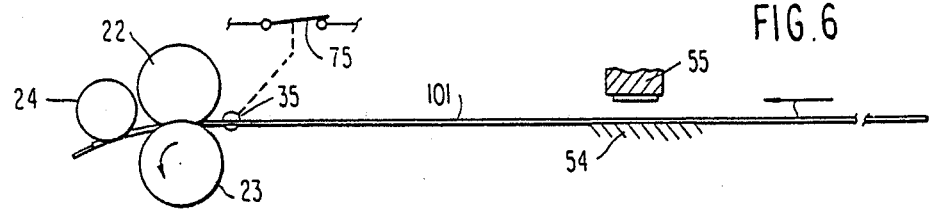
FIGS. 6–8 are schematic views illustrating the operation of the machine in accordance with the present invention.

Referring now to the drawing wherein like reference numerals are used throughout the various views to designate like parts, and more particularly to FIGS. 1 to 3, the preforming and stamping machine in accordance with the present invention is mounted on a base plate generally designated by reference numeral 15 whose front face 16 is visible in FIG. 1. The preforming machine in accordance with the present invention essentially consists of two parts; namely, a preforming machine assembly generally designated by reference numeral 20 which performs the preforming operation of the flat blank as shown, for example, in FIGS. 9 and 10, into a circular open-type clamp, as shown, for example, in FIG. 11, and of a stamping machine assembly generally designated by reference numeral 50 for stamping the flat blank with appropriate indicia, such as, date, trade name or trademark of the user, part number and the like.

The preforming machine assembly 20 includes a housing 21 containing the necessary gearing (not shown) of conventional construction to drive the pair of rollers 22 and 23 from the drive motor 40 which is preferably a compressed air motor of known type. The rollers 22 and 23 are driven by drive shafts 32 and 33, respectively (FIG. 4). The rollers 22 and 23, which in their simplest form are provided with flat outer surfaces, are thereby of such dimensions that the gap formed therebetween corresponds to the thickness of the material used for the flat blank so that the oppositely rotating rollers 22 and 23 will feed the blank through the machine as long as the blank is in contact with the rollers. In a preferred embodiment of the present invention, the outer circumferential surfaces of the rollers 22 and 23, instead of being flat, are bevelled on each side (FIG. 4), as indicated by reference numerals 22' and 23' so that the lateral edges 101' of the preformed clamp 101 (FIG. 11) are bent in the radially outward direction at an angle, for example, of 45° in order to minimize the danger of damage to a hose-like material to be fastened by the clamp. A freely rotatably guide roller 24 is so located in the rectilinear feed path of the flat blank toward and through the feed rollers 22 and 23 that it will deform the flat blank into circular configuration when the flat blank, positively fed by the rollers 22 and 23, encounters the outer surface of the deforming roller 24. The roller 24 is thereby freely rotatably mounted on a support arm 25 whose lower end is slotted at 25' for engagement over a threaded tightening member 26 which, when loosened, serves at the same time as pivot shaft for the support arm 25. The radius of the preformed clamp can thus be adjusted by movement of the support arm in the direction of its slot 25' as well as in the pivotal direction. An adjusting screw 27 held in position by a lock nut 28, holds the support arm 25 in position against the deforming forces exerted thereon by the flank as it is forced through the preforming machine assembly by the feed rollers 22 and 23. The adjusting screw 27 thereby assists the tightening member 26 in holding the support arm 25 in proper position.

Figure 8:
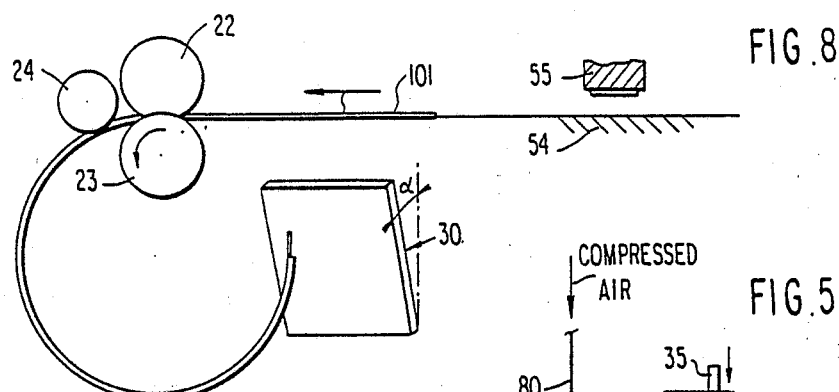

Since the open ends of the preformed clamp are intended to overlap (FIG. 11) to permit closing thereof by engagement of the hooks 102 in apertures 103 (FIG. 9), an L-shaped deflection plate generally designated by reference numeral 30 is provided which causes an additional deformation of the clamp in such a manner that the free ends of the preformed clamp are spaced a small distance from one another in the axial direction (FIG. 11). In that way, the leading deformed edge of the circular clamp will not interfere with completion of the preforming operation by seeking to re-enter the gap between the feed rollers 22 and 23. The L-shaped deflection plate 30 which is mounted on the base plate 15 with a horizontal leg 31a thereof, includes a second leg 31b in the form of a flat plate which extends at an acute angle α (FIG. 8) upwardly and outwardly with respect to a vertical plane perpendicular to the axes of the shafts 32 and 33 and containing the rectilinear feed path of a blank through the machine. Additionally, the deforming plate 31b is also inclined outwardly at an acute angle β (FIG. 3) with respect to this plane in a direction opposite the rectilinear feed movement of the blank to the feed rollers 22 and 23 so that the free leading end of the preformed clamp is axially spaced from the trailing free end (FIG. 11) due to the fact that no deforming action is exerted by the plate 31b on the trailing end once it leaves the feed rollers 21 and 22. A guide member 29, for example, an L-shaped rod, is thereby so mounted on the housing 21 that its shorter leg 29' extends into the area of the inlet of the feed rollers 22 and 23 to prevent the blank material from straying laterally from its rectilinear feed path and instead to confine the blank to the area of the gap formed between the feed rollers 22 and 23.

Attached to the housing 21 is additionally a small block-like member 34 which provides rectilinear guidance for the flat blank, for example, by the provision of an appropriately shaped slot in a die secured in member 34. A sensor element 35 is displaceably mounted within the housing 21 along the rectilinear path of the flat blank shortly ahead of the gap between the feed rollers 22 and 23. The sensor element 35 is thereby so constructed and arranged by conventional means that it will be displaced by the arrival of the full width of the flat blank to thereby initiate operation of the control cycle of the machine in accordance with the present invention, as will be described more fully hereinafter. The sensor element 35 may be, for example, a cylindrical member rotatable about a vertical axis and displaceable in a direction parallel to shafts 32 and 33. The sensor element 35 thereby actuates a valve 75 by way of a suitable linkage (not shown) mounted within housing 21.

The stamping machine assembly generally designated by reference numeral 50 includes two lateral housing walls 51 and 52 which are held in proper bolted-together position by the use of spacer members (not shown). The stamping machine assembly further includes a relatively fixed support member 54 provided with a groove-like channel whose upper blank-support surface 54' is flush with and forms part of the rectilinear feed path of the flat blank, and a pivotal pressure member 55 rotatable in a conventional manner about a pivot axis (not shown) and having a lower flat stamping surface which is thereby so constructed and pivotally supported by known means that its stamping surface will be parallel to the upper support surface 54' when it comes into contact with the upper surface of the blank. Secured to the pivotal stamping member 55 is an approximately L-shaped arm 62 which is adapted to be engaged by a roller-like member 63 fastened to a disk-like actuating member 64 eccentrically connected to the disk-like driving member 65 which is coaxial with and driven by a larger gear 66. To provide a large speed-reduction arrangement, as required to produce the necessary stamping force, the motor shaft 56' of the compressed air motor 56 drives the gear 66 by way of a first speed-reducing gear arrangement, for example, a chain and sprocket gearing arrangement generally designated by reference numeral 57 whose smaller gear 57a non-rotatably connected with motor shaft 56' drives a larger gear 57b mounted on shaft 58 while a second speed-reduction is provided by the meshing engagement of a small gear 59 non-rotatably mounted on shaft 58 with the much larger gear 66 rotating in unison with the disk-like driving members 64 and 65 supported on shaft 61. Rotation of the motor 56 in the clockwise direction, as viewed in FIG. 2, will thus cause rotation of the disk-like members 64 and 65 in the counterclockwise direction so as to cause the roller-like member 63 to pivot the pressure member 55 in the clockwise direction by engagement with arm 62 and thereby causing the stamping press to close and to move from the position shown in FIG. 6 to the position shown in FIG. 7 in which it will impress the indicia on the blank. Rotation of the compressed air motor 56 in the opposite, counterclockwise direction, as viewed in FIG. 2, will then cause reopening of the stamping press by rotation of the gear 66, of the disk-like member 65 and of the disk-like actuating member 64 in the clockwise direction and therewith of the pressure member 55 in the opposite (counterclockwise) direction which is assisted by a spring 67 urging the pivotally mounted pressure member 55 in the opening direction by way of a slide structure generally designated by reference numeral 90. The slide structure 90 is thereby so constructed and arranged, utilizing known translatory means by interaction of the pin 90a in a suitably shaped guide slot 90b that spring 67 is compressed during clockwise rotation of the stamping member 55 by shifting the rod 90c toward the left. Suitable guide means formed, for example, by appropriately shaped dies or the like (not shown) may also be provided in the lateral walls 51 and 52 to assure rectilinear guidance of the flat blank through the machine.

A control arm 70 (FIGS. 2 and 5) which is rotated by compressed air motor 56 by way of a shaft 69 (FIGS. 3 and 5) and by way of a speed-reduction gearing, if necessary, is rotatably arranged within housing 121 and is operable to be rotated to and fro between a first position in which it engages the actuating member 71' of a valve 71 and a second position in which it engages the actuating member 72' of a valve 72 during closing and opening of the stamping press.

Figure 5:
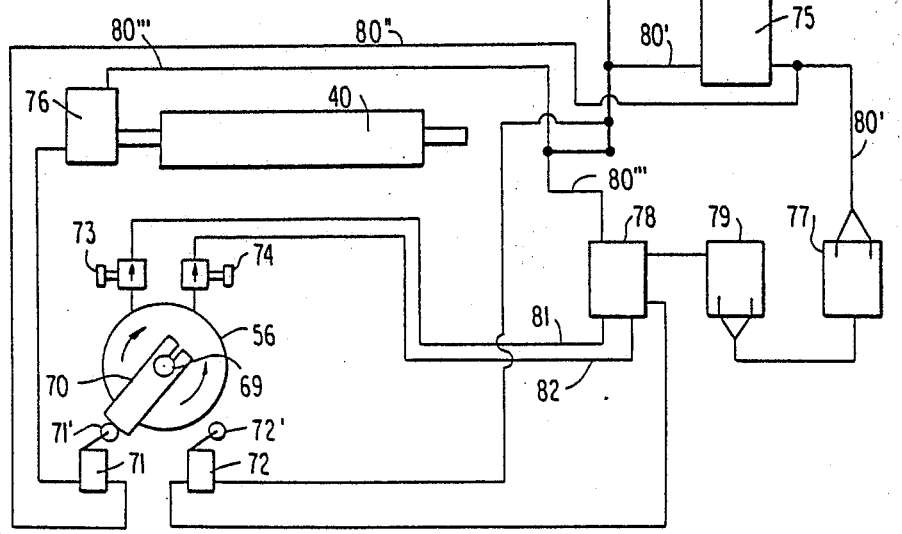
FIG. 5 is a schematic diagram of the pneumatic control system used in the preforming machine of the present invention.

The pneumatic control system of the present invention, illustrated in FIG. 5, additional includes a control valve 76 for controlling operation of the pneumatic motor 40 as well as a delay valve 77 and a control valve 78 connected with the delay valve 77 by way of a further valve 79, for purposes to be explained more fully hereinafter. The control valve 78, in turn, controls the operation of the compressed air motor 56 by way of the valves 71 and 72 which are each opened by engagement of the control arm 70 with the respective actuating member 71' and 72' as the control reaches the corresponding end position. The valve 71 thereby controls rotation of the motor 56 in the clockwise direction, as viewed in FIG. 2, while valve 72 controls rotation thereof in the counterclockwise direction. Adjustable throttle members 73 and 74 are interconnected in the lines supplying compressed air to the motor 56 so as to enable adjustment of the speed of operation thereof.

OPERATION

The operation of the stamping and preforming machine in accordance with the present invention will now be described.

Figure 7:
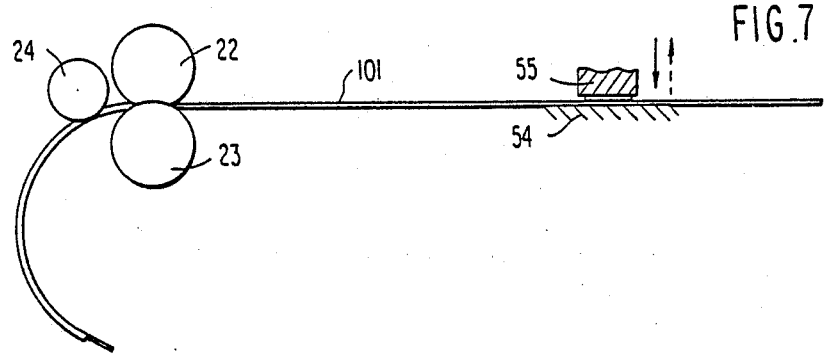

At first, a flat blank is inserted by the operator into the machine through the guide (not shown) in the lateral wall 51, through the opened stamping press 54, 55 through the guide (not shown) in the lateral wall 52 and through the guide in the block-like member 34 in such a manner that the full width of the leading free end of the flat blank comes in contact with the sensor element 35. In case the flat blank is intended to form a stepless clamp and therefore includes a tongue portion 107, as described in my U.S. Pat. No. 4,315,348, the sensor element 35 will not be actuated by the narrower tongue portion but will be actuated only by the leading edge of the full-width blank at which time the tongue portion is already between the feed rollers 22 and 23. The actuation of the sensor element 35 will operate the valve 75 by way of a linkage, indicated only schematically in FIG. 6 in dash lines, thereby opening the normally closed valve 75 so as that compressed air from the compressed air supply line 80 will flow by way of a line 80', through the now open valve 75 and by way of a further branch line 80" to the control input of the valve 76 by way of the now-open valve 71 which is opened at that time by engagement of the control arm 70 with actuating member 71'. Control arm 70 is in its end position in which the stamping press is fully opened, i.e., the pivotal member 55 thereof is rotated into its open position. As a result thereof, the valve 76 is opened so that compressed air will be supplied from line 80 by way of branch line 80''' and through the now-opened valve 76 to the compressed air motor 40 which starts to rotate the feed rollers 22 and 23 thereby causing the flat blank 101 to be advanced as long as motor 40 rotates. Opening of the valve 75 will also apply compressed air to the inputs of the delay valve 77 by way of branch line 80'. However, delay valve 77 will delay for a predetermined period of time, the opening thereof and therewith the application of compressed air to the control input of valve 78 so as to delay opening of the valve 78 and therewith application of compressed air from the supply line 80 by way of branch line 80''' and line 81 to the hydraulic motor 56. During the predetermined delay, the motor 40 drives the feed rollers 22 and 23 so as to advance the flat blank by a certain distance to assure stamping thereof in the desired part (FIG. 6). As soon as the valve 78 opens the connection between branch line 80''' and line 81, the motor 56 and with it the control arms 70 start to rotate in the clockwise direction, thereby causing the previously opened valve 71 to close, which in turn causes closure of valve 76 and stoppage of the pneumatic motor 40. Thus, upon actuation of the sensor 35, the compressed air motor 40 will initially cause feed of the blank by the rollers 22 and 23 for such length of time until the control arm 70 starts to rotate after the expiration of the predetermined delay by control valve 77 and disengages from the actuating member 71'. However, while motor 40 is now stopped, motor 56 will continue to rotate in the clockwise direction to close the stamping press and ultimately to stamp the stopped blank until control arm 70 comes into engagement with the actuating member 72' which causes the valve 78 to close the connection between branch line 80''' and line 81 and instead to open the connection from branch line 80''' to line 82. As a result thereof the motor 56 and therewith the control arm 70 will start to rotate in the counterclockwise direction, after completion of the stamping operation which is terminated when the control arm 70 reaches its end position where it comes into engagement with the actuating member 72'. The valves 78 and 79 are thereby so constructed and interconnected that once the control arm 70 opens the valve 72 by engagement with its actuating member 72', thereby applying compressed air to the second control input of the valve 78 and shifting the same, the hydraulic motor 56 will continue to operate in the counterclockwise direction for a predetermined length of time to permit the control arm 70 to reach again its starting position corresponding to the fully open position of the stamping press, in which valve 71 is opened up again by engagement of the control arm 70 with actuating member 71'. As a result thereof, the motor 40 will start to rotate again for such length of time until the sensor 35 is released, which will happen when the trailing end of the flat blank has passed beyond the sensor 35. In the meantime rotation of motor 40 will cause the feed rollers 22 and 23 to feed the blank through the machine (FIGS. 7 and 8) until completion of the preforming operation resulting in the pre-formed clamp as shown in FIG. 11. The various valve elements are of commercially available type forming no part of the present invention so that a detailed description thereof is dispensed with for the sake of brevity.

Of course, the machine in accordance with the present invention can also be used only as preforming machine by omitting the stamping machine assembly part 50 thereof. In that case, it is only necessary to connect the valve 75 directly with the valve 76 to control operation of the motor 40.

While the machine of the present invention can be used with any number of clamps that can be stamped out as flat blanks, a clamp with pressed-out tool engaging embossments 108 and 109 as disclosed in my copending application Ser. No. 446,503, filed on Dec. 3, 1982, now U.S. Pat. No. 4,492,004, the subject matter of which is incorporated herein by reference, offers particular advantages in certain applications, where the absence of any projecting part such as an "Oetiker" ear or the bent out ends of a screw-type clamp are important. However, by appropriate minor modifications in the machine providing recesses where required, the present invention can also be used to preform screw-type clamps or "Oetiker"-ear type clamps from the punched-out rectilinear shape into the preformed circular shape. Consequently, the term "flat blank" is used herein to describe the fact that the band material as such is not curved but remains in substantially rectilinear condition though it already includes teeth or hooks as well as possibly an ear and in case of a stepless clamp, the tongue and recess, all of which are formed in the band material during the stamping out operation of the flat blank.

The machine of the present invention thus permits to ship to the customer clamps, such as axle sleeve clamps, in straight (flat) condition which can be inserted into the machine in such straight or flat condition by the customer so as to preform the same just prior to installation on the assembly line. For example, the operator on the assembly line inserts the straight (flat) clamp into the machine. The machine then automatically initiates the start of a fully automatic operating cycle in response to the insertion of the clamp to stamp the clamp with the desired indicia and to preform the clamp into circular shape of any desired diameter, whereby the completely preformed and stamped clamp with its edges bent up falls automatically out of the machine. During this operating cycle, the operator installs the previously preformed clamp and thus loses no time while waiting for completion of the automatic operating cycle.

Heretofore, axle boots or axle sleeves were fastened by round, ring-like clamps, made from a round wire formed into the shape of a ring, whose ends were butt-welded. The welded place had to be cleaned and sanded to provide a smooth surface, whereupon the round wire material was rolled flat. After subsequent surface treatment, the thus obtained ring was placed over the axle sleeve and thereafter was shrunk to the predetermined diameter by the use of a special machine. Apart from high costs, this prior art approach required the complete disassembly of the axle and the use of a new axle sleeve in case of needed repairs since removal of the shrunk-on ring frequently destroyed the axle sleeve or axle boot.

In addition to eliminating the drawbacks of the aforementioned prior art approach, the present invention also entails significant cost advantages as regards packing, shipping, storing and handling of clamps, for example, for use with axle sleeves. More specifically, if the same axle sleeve clamps of standard size are delivered to the customer in round condition, i.e., preformed into circular shape, the costs for packaging, labor and shipping as well as storing would be about 18 times the costs for the same clamp if shipped in straight (flat) condition and preformed when used only on the assembly line. Of course, the cost-saving factor may vary according to the size of the clamp.

In order to permit manual operation of the stamping machine assembly and of the preforming machine assembly, it is only necessary to shape the projecting end of shaft 56′ and of shaft 32 for engagement with a complementary key of polygonal shape.

While I have shown and described only one embodiment in accordance with the present invention, it is understood that the same is not limited thereto but is susceptible f numerous changes and modifications as known to those skilled in the art. For example, in lieu of the pneumatic control system, also an electric or electronic control system may be used, though the pneumatic control system is particularly advantageous from a safety and efficiency point of view. Additionally, the angle of the bent-up edges 101′ may also be chosen within wide limits to suit particular needs. Consequently, I do not wish to be limited to the details shown and described herein but intend to cover all such changes and modifications as are encompassed by the scope of the appended claims.

I claim:

1. A machine for preforming individually pre-cut plastically deformable substantially flat blanks of band material each provided with integral mechanical interconnecting means near the free ends to form an individual open clamp adapted to be mechanically interconnected by said mechanical interconnecting means, when the free ends of the blank overlap, into a circular clamp having a configuration, when leaving the machine, at least approximately corresponding to the configuration of the clamp when being installed about an object to be fastened onto a relatively fixed, generally circular part, comprising roller means for feeding the pre-cut flat blank through the machine including a pair of rollers having predetermined external configuration for receiving each blank and its respective integral mechanical interconnecting means said rollers being spaced from one another a distance essentially corresponding to the thickness of an individual flat blank, drive means for rotating said pair of rollers to impart a linear movement to the individual pre-cut blank as it passes through the roller pair, guide means ahead of said roller pair for guiding a flat blank toward and through the space between said pair of rollers along a substantially rectilinear path, and further means including first deflection surface means downstream of said pair of rollers and operable to engage with said blank for deforming the individual pre-cut flat blank into generally circular shape corresponding to said generally circular configuration and of such diameter that the free ends thereof overlap, second deflection surface means downstream of said first deflection surface means and operable to engage with the pre-cut blank deformed by said first deflection surface means before the ends thereof overlap in the generally circular configuration imparted thereto by said first deflection surface means to plastically deform the overlapping free ends of the open clamp in order to exhibit a remaining axial spacing from one another by a relatively small axial distance so that the preformed open clamp, after leaving said machine, has said generally circular shape with the overlapping ends thereof axially spaced to thereby facilitate radial assembly of the thus preformed clamp over the object to be fastened. and control means for operating said machine for a predetermined length of time so that said precut blank is red through said pair of rollers, first and second deflection surface means to deform said blank with said overlapping and axially spaced ends.

2. A machine according to claim 1, wherein said first deflection surface means is located behind said pair of rollers in the path of the blank as it comes from the pair of rollers, in such a manner that said blank is continuously preformed into a permanent, generally circular shape by forced engagement with said firs deflection surface means, and wherein second deflection surface means is located in the path of the blank after being preformed by said first deflection surface means into said generally circular shape to cause the free ends of the preformed clamp to be plastically deformed so as to be spaced from one another the small distance in the axial direction of the clamp as the preformed clamp leaves the machine.

3. A machine according to claim 2, wherein said second deflection surface means is located in the path of the blank preformed by said first deflection surface means as the leading edge of the generally circularly shaped blank reaches the area of between about half and about three-quarters of its circular configuration.

4. A machine according to claim 3, wherein said second deflection surface means is operable on a given clamp until its trailing edge passes through the pair of rollers.

5. A machine according to claim 2, in which said first deflection surface means has a curved surface so located and offset with respect to said path near the outlet of the pair of rollers that the blank is continuously deformed as it is forced past into engagement with said curved surface by the action of the pair of rollers.

6. A machine according to claim 5, wherein said first deflection surface means is a further freely rotatable roller whose curved surface is so located within the area of said path as to cause deformation of the blank into generally circular shape.

7. A machine according to claim 6, further comprising means for adjusting the diameter of the preformed clamp by selectively displacing said first deflection surface means in relation to the outlet of said pair of rollers.

8. A machine according to claim 7, wherein said further roller is supported near one end of a support arm whose other end is pivotally and longitudinally displaceably supported at a relatively fixed part of the machine, and wherein said adjusting means includes means for holding said support arm in its adjusted position against the forces exerted thereon by the fed blank.

9. A machine according to claim 6, wherein said second deflection surface means is a plate-like member so located that with respect to a vertical plane containing said substantially rectilinear path, said plate is inclined at an acute angle upwardly outwardly to said vertical plane as also outwardly in a direction opposite the movement of the blank along said path.

10. A cyclically operable machine according to claim 2, further comprising sensor means along aid path to sense the presence of a blank and thereby initiate a cycle of operation.

11. A machine according to claim 1, further comprising means for marking the flat blank with predetermined indicia as it passes through the machine, said marking means being located ahead of said pair of rollers.

12. A machine according to claim 11, wherein said marking means is in the form of a stamping press and includes a fixed support member for supporting thereon a flat blank, a rotatably supported pressure member having a stamping surface which is located relative the fixed support member so as to accommodate therebetween a flat blank, said pressure member being operable to impress the indicia on the surface of the blank as the pressure member moves toward the support member, and actuating means for actuating said pressure member in such a manner that it is moved from a rest position spaced from the support member into a stamping position in contact with the blank and after completing the marking is again retracted into the rest position.

13. A machine according to claim 12, wherein said actuating means includes a member rotated to and fro and operable to engage with an arm connected with said pressure member so as to pivot the latter from the rest position into the stamping position and back to its rest position during its to and fro movements.

14. A machine according to claim 12, further comprising control means including sensor means operable to sense the presence of a blank within the area of the inlet of said feed means for cyclically controlling the operation of the machine in such a manner that at first the blank is moved by said feed means a predetermined distance past the roller pair, the feed means is then stopped and the marking means is rendered operable to mark the blank, and after completion of the marking operation, the feed means is reactivated and the blank is then completely preformed.

15. A machine according to claim 1, wherein said pair of rollers have flat circumferential surfaces.

16. A machine according to claim 1, wherein said pair of rollers have complementary outer surfaces of such configuration that the edges of the blank are bent upwardly out of the plane of the blank in a direction opposite the deformation thereof into the generally circular shape.

17. A machine according to claim 6, further comprising means for making the flat blank with predetermined indicia as it passes through the machine, said marking means being located ahead of said pair of rollers.

18. A cyclically operated machine according to claim 17, wherein said marking means is in the form of a stamping press and includes a fixed support member for supporting thereon a flat blank, a rotatably supported pressure member having a stamping surface which is located relative the fixed support member so as to accommodate therebetween a flat blank, said pressure member being operable to impress the indicia on the surface of the blank as the pressure member moves toward the support member, and actuating means for actuating said pressure member in such a manner that it is moved from a rest position spaced from the support member into a stamping position in contact with the blank and after completing the marking is again retracted into the rest position.

19. A machine according to claim 18, wherein said actuating means includes a member rotated to and fro and operable to engage with an arm connected with said pressure member so as to pivot the latter from the rest position into the stamping position and back to its rest position during its to and fro movements.

20. A machine according to claim 19, further comprising control means including sensor means operable to sense the presence of a blank within the area of the inlet of said feed means for cyclically controlling the operation of the machine in such a manner that at first the blank is moved by said feed means a predetermined distance past the roller pair, the feed means is then stopped and the marking means is rendered operable to mark the blank, and after completion of the marking operation, the feed means is reactivated and the blank is then completely preformed.

21. A machine for preforming a plastically deformable substantially flat pre-cut blank of a band material provided with mechanical interconnecting means near the free ends to form an individual clamp adapted to be mechanically interconnected by said mechanical interconnecting means, when the free ends of the blank overlap, into a circular clamp having a configuration, when leaving the machine, at least approximately corresponding to the configuration of the clamp when being installed about an object to be fastened onto a relatively fixed, generally circular part, comprising means for feeding the flat blank through the machine including a pair of rollers having predetermined external configuration, said rollers being spaced from one another a distance essentially corresponding to the thickness of the blank, drive means for rotating said pair of rollers to impart a linear movement to the first blank as it passes through the roller pair, guide means for guiding a flat blank toward and through the space between said pair of rollers along a substantially rectilinear path, further means including first deflection surface means and second deflection surface means located downstream from said first deflection surface means operable to engage with said blank for plastically deforming the individual flat blank into generally circular shape corresponding to said generally circular configuration with the free ends thereof overlapping and axially spaced from one another, means for marking the flat blank as it passes through the machine and control means for operating said machine and said means for marking the flat blank for a predetermined length of time so that said precut blank is red through said pair of rollers, first and second deflection surface means to mark and deform said blank with said overlapping and axially spaced ends.

22. A machine according to claim 21, wherein said marking means is in the form of a stamping press and includes a fixed support member for supporting thereon a flat blank, a rotatably supported pressure member having a stamping surface which is located relative the fixed support member so as to accommodate therebetween a flat blank, said pressure member being operable to impress the indicia on the surface of the blank as the pressure member moves toward the support member, and actuating means for actuating said pressure member in such a manner that it is moved from a rest position spaced from the support member into a stamping position in contact with the blank and after completing the marking is again retracted into the rest position.

23. A machine according to claim 22, wherein said actuating means includes a member rotated to and fro and operable to engage with an arm connected with said pressure member so as to pivot the latter from the rest position into the stamping position and back to its rest position during its to and fro movements.

24. A machine according to claim 22, further comprising control means including sensor means operable to sense the presence of a blank within the area of the inlet of said feed means for cyclically controlling the operation of the machine in such a manner that at first the blank is moved by said feed means a predetermined distance past the roller pair, the feed means is then stopped and the marking means is rendered operable to mark the blank, and after completion of the marking operation, the feed means is reactivated and the blank is then completely performed.

* * * * *